(12) United States Patent
Kudo

(10) Patent No.: US 9,196,276 B2
(45) Date of Patent: Nov. 24, 2015

(54) HEAD GIMBAL ASSEMBLY AND DISK UNIT PROVIDED WITH THE SAME

(71) Applicant: KABUSHIKI KAISHA TOSHIBA, Tokyo (JP)

(72) Inventor: Masaya Kudo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/190,740

(22) Filed: Feb. 26, 2014

(65) Prior Publication Data

US 2015/0138669 A1    May 21, 2015

(30) Foreign Application Priority Data

Nov. 15, 2013 (JP) .................................. 2013-236673

(51) Int. Cl.
| G11B 5/48 | (2006.01) |
| G11B 21/16 | (2006.01) |
| G11B 5/55 | (2006.01) |

(52) U.S. Cl.
CPC .............. G11B 5/482 (2013.01); G11B 5/5552 (2013.01)

(58) Field of Classification Search
CPC .. G11B 5/5552; G11B 5/4826; G11B 5/4873; G11B 5/4833
USPC .......... 360/245.3–245.5, 245.8, 245.9, 244.3, 360/244.5–244.7
See application file for complete search history.

(56) References Cited

U.S. PATENT DOCUMENTS

| 8,295,012 | B1 * | 10/2012 | Tian et al. .................. 360/245.4 |
| 8,310,790 | B1 * | 11/2012 | Fanslau, Jr. ................ 360/294.4 |
| 2009/0244786 | A1 | 10/2009 | Hatch |
| 2010/0195251 | A1 * | 8/2010 | Nojima et al. ............. 360/245.3 |
| 2010/0246071 | A1 * | 9/2010 | Nojima et al. ............. 360/294.4 |
| 2011/0211274 | A1 | 9/2011 | Kuwajima |
| 2012/0087041 | A1 | 4/2012 | Ohsawa |
| 2012/0099226 | A1 * | 4/2012 | Zambri et al. ............. 360/245.3 |
| 2013/0301164 | A1 * | 11/2013 | Nishida et al. ............. 360/244.7 |

FOREIGN PATENT DOCUMENTS

JP    2011-138596 A    7/2011

* cited by examiner

*Primary Examiner* — Adam B Dravininkas
(74) *Attorney, Agent, or Firm* — Patterson & Sheridan, LLP

(57) ABSTRACT

A head gimbal assembly includes a load beam, a wiring member including a metal plate disposed on the load beam, a magnetic head attached to a tip section of the wiring member, and a piezoelectric element that is fixed to and supported by supporting pads and deforms in response to a voltage applied thereto. The metal plate includes a tip section to which the magnetic head is fixed, and a base section that is spaced apart from the tip section and is fixed to the load beam. The supporting pads include first and second supporting pads proximate to the tip section and distal from the base section and a third supporting pad proximate to the base section and distal to the tip section, each of supporting pads separated from and independent of both the tip section and the base section.

15 Claims, 7 Drawing Sheets

HEAD GIMBAL ASSEMBLY AND DISK UNIT PROVIDED WITH THE SAME

CROSS-REFERENCE TO RELATED APPLICATION

This application is based upon and claims the benefit of priority from Japanese Patent Application No. 2013-236673, filed Nov. 15, 2013, the entire contents of which are incorporated herein by reference.

FIELD

Embodiments described herein relate generally to a head gimbal assembly used in a storage device and a disk unit provided with the same.

BACKGROUND

In recent years, disk drives such as a magnetic disk drives and an optical disk drives are widely used as an external recording device and an image recording device of a computer.

The magnetic disk drive generally includes a magnetic disk placed in a case, a spindle motor that supports and rotates the magnetic disk, and a head gimbal assembly (HGA). The head gimbal assembly includes a suspension that is attached to a tip section of an arm, a flexure (a wiring member) that is provided on the suspension and is connected to the outside, and a magnetic head that is supported on the suspension with a gimbal section of the flexure. A wiring of the flexure is electrically connected to the magnetic head. Moreover, the suspension includes a load beam and a base plate fixed to a base end side of the load beam, and the base plate is fixed to the tip section of the arm.

In recent years, an HGA in which a thin-film piezoelectric element (PZT element) is mounted on a gimbal section of a flexure and a microscopic displacement is caused in a seek direction of a magnetic head by an expansion and contraction of the piezoelectric element, has been proposed. With this HGA, the operation of the magnetic head may be controlled by varying a voltage applied to the piezoelectric element.

However, in the above-described HGA, when the piezoelectric element expands or contracts by a voltage application, the piezoelectric element bends in a thickness direction thereof and an out-of-plane vibration is sometimes generated. The out-of-plane vibration is transferred to a load beam via the flexure, unnecessarily exciting the resonance frequency of the load beam. As a result, the positioning accuracy of the magnetic head is reduced.

DETAILED DESCRIPTION

An exemplary embodiment provides a head gimbal assembly and a disk unit that may suppress the vibration of a load beam.

In general, according to one embodiment, a head gimbal assembly includes a load beam, a wiring member including a metal plate disposed on the load beam, an insulating layer disposed on the metal plate and the load beam, and a conductive layer forming first and second wirings, a magnetic head electrically connected to the first wiring of the wiring member and attached to a tip section of the metal plate, and a piezoelectric element that is fixed to and supported by supporting pads and configured to deform in response to a voltage applied thereto through the second wiring. The metal plate includes a tip section to which the magnetic head is fixed, and a base section that is spaced apart from the tip section and is fixed to the load beam. The supporting pads include first and second supporting pads proximate to the tip section and distal from the base section and a third supporting pad proximate to the base section and distal to the tip section, each of the supporting pads separated from and independent of both the tip section and the base section.

Hereinafter, with reference to the drawings, a hard disk drive (HDD) will be described in detail as a magnetic disk unit according to an embodiment.

First Embodiment

Figure 1:
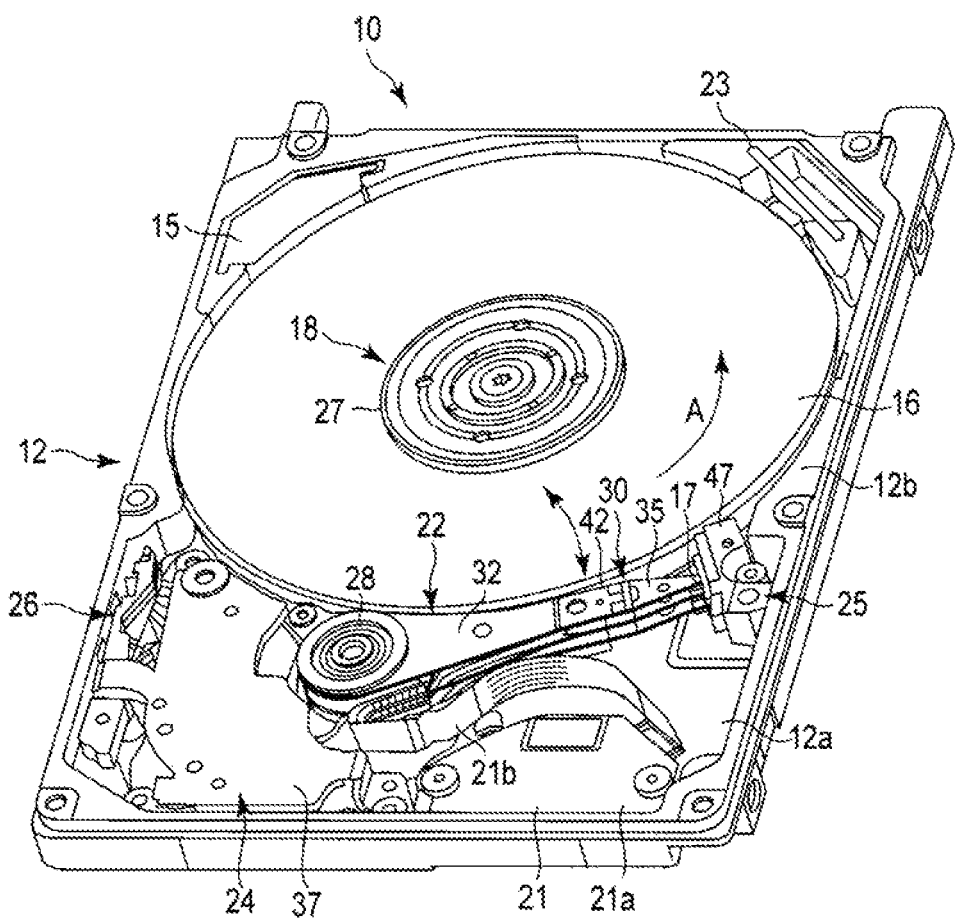
FIG. 1 is a perspective view showing a hard disk drive (HDD) according to a first embodiment.

FIG. 1 shows an internal structure of the HDD from which a top cover is removed. As shown in FIG. 1, the HDD includes a housing 10. The housing 10 includes a base 12 in the shape of a rectangular box, with an opening on a top face thereof, and a top cover (not shown) that closes the top opening of the base 12 by being secured to the base 12 with a plurality of screws. The base 12 includes a rectangular bottom wall 12*a* and a side wall 12*b* erected along the outer edge of the bottom wall.

In the housing 10, two magnetic disks 16 are provided as recording media and a spindle motor 18 is provided as a drive section that supports and rotates the magnetic disks. The spindle motor 18 is provided on the bottom wall 12*a*. Each magnetic disk 16 is formed to have a diameter of 2.5 inches (6.35 cm), for example, and includes a magnetic recording layer on a top face and a lower face. The magnetic disks 16 are concentrically fitted onto a hub (not shown) of the spindle motor 18 and are clamped by a clamp spring 27 and thereby fixed to the hub. As a result, the magnetic disks 16 are supported in a state in which the magnetic disks 16 are parallel to the bottom wall 12*a* of the base 12. The magnetic disks 16 are rotated by the spindle motor 18 at a predetermined speed.

In the housing 10, a plurality of magnetic heads 17 that record and reproduce information on and from the magnetic disks 16 and a head stack assembly (hereinafter referred to as an HSA) 22 that movably supports the magnetic heads 17 with respect to the magnetic disks 16 are provided. Moreover, in the housing 10, a voice coil motor (hereinafter referred to as a VCM) 24 that rotationally moves and positions the HSA 22, a ramp loading mechanism 25 that holds the magnetic heads in an unloading position which is away from the magnetic disks when the magnetic heads 17 move to the outermost periphery of the magnetic disks 16, a latch mechanism 26 that holds the HSA in a retraction position when an impact or the like is given to the HDD, and a substrate unit 21 including a connector and so forth, are provided.

On the outer surface of the bottom wall 12a of the base 12, a printed circuit board (not shown) is secured with screws. The printed circuit board controls the operations of the spindle motor 18, the VCM 24, and the magnetic heads 17 via the substrate unit 21. Near the side wall 12b of the base 12, a circulating filter 23 that captures dust generated in the housing due to the operation of the movable section is provided and is located on the outside of the magnetic disks 16. Moreover, near the side wall 12b of the base 12, a breathing filter 15 that captures dust from the air flowing into the housing 10 is provided.

As shown in FIG. 1, the HSA 22 includes a rotatable bearing unit 28, four arms 32 that are attached to the bearing unit in a stacked configuration, a head gimbal assembly (hereinafter referred to as an HGA) 30 extending from each arm 32, and spacer rings (not shown) disposed in such a way as to be stacked between the arms 32. Each arm 32 is formed to have a long flat plate-like shape from stainless steel, aluminum, or the like, for example. Each arm 32 includes a tip section on the side where an extension end is located, and, in this tip section, a caulking bearing surface provided with a caulking hole (not shown) is formed. The bearing unit 28 includes a pivot erected in the bottom wall 12a of the base 12 near the outer periphery of the magnetic disks 16 and a cylindrical sleeve rotatably supported on the pivot with a bearing placed between the cylindrical sleeve and the pivot.

Figure 2:
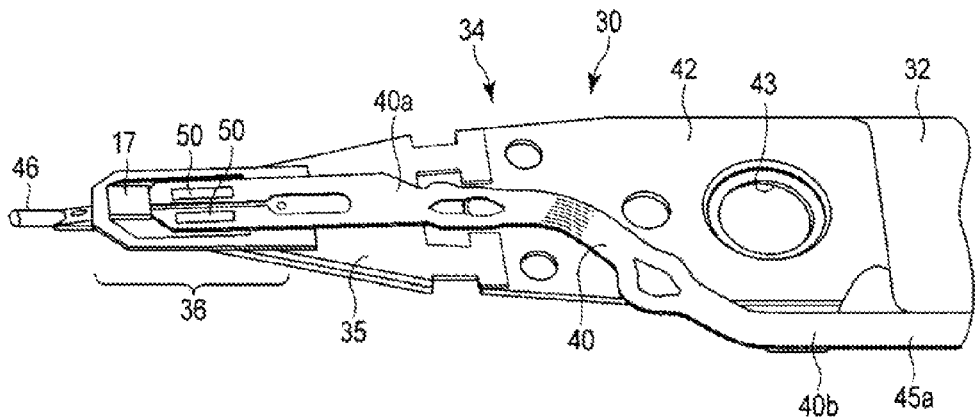
FIG. 2 is a perspective view showing a head gimbal assembly of the HDD.

FIG. 2 is a perspective view showing the HGA 30. As shown in FIGS. 1 and 2, each HGA 30 includes a suspension 34 extending from the arm 32 and a magnetic head 17 supported on the extension end of the suspension 34.

The suspension 34 includes a rectangular base plate 42 made of a metal plate which is several hundreds of micrometers in thickness and a load beam 35 in the shape of a long leaf spring, the load beam 35 being made of a metal plate which is several tens of micrometers in thickness. A base end of the load beam 35 is disposed in such a way as to be stacked on a tip section of the base plate 42 and is fixed to the base plate 42 by performing welding in multiple places. The width of the base end of the load beam 35 is formed to be substantially equal to the width of the base plate 42. At the tip of the load beam 35, a long rod-like tab 46 is provided in such a way as to protrude therefrom.

The base plate 42 is provided with a circular opening and a ring-shaped protrusion 43 located around this opening in a base end thereof. The base plate 42 is secured to the tip section of the arm 32 as a result of the protrusion 43 being fitted into the circular caulking hole (not shown) formed in the caulking bearing surface of the arm 32 and the protrusion 43 being crimped.

The HGA 30 includes a pair of piezoelectric elements (PZT elements) 50 and a long strip-shaped flexure (wiring member) 40 for transmitting a recording and reproduction signal and a drive signal of the piezoelectric element. As shown in FIG. 2, a tip-side portion 40a of the flexure 40 is mounted on the load beam 35 and the base plate 42, and a rear portion (an extending section) 40b extends from a side edge of the base plate 42 to the outside and extends along a side edge of the arm 32. In addition, a connection end of the flexure 40 located at the tip of the extending section 40b is connected to a main FPC 21b which will be described later.

A tip section of the flexure 40 located on a tip section of the load beam 35 forms a gimbal section 36, and the magnetic head 17 and the piezoelectric elements 50 are mounted on the gimbal section 36. The magnetic head 17 includes a slider having a virtually prismatic shape and a recording element and a reproduction element which are provided in the slider, and is fixed on the gimbal section 36 and is supported on the load beam 35 with the gimbal section 36 placed between the magnetic head 17 and the load beam 35. A pair of the piezoelectric elements (PZT elements) 50 is attached to the gimbal section 36 and is located, near the magnetic head 17, on the side of the load beam 35 where the base end thereof is located.

Figure 3:
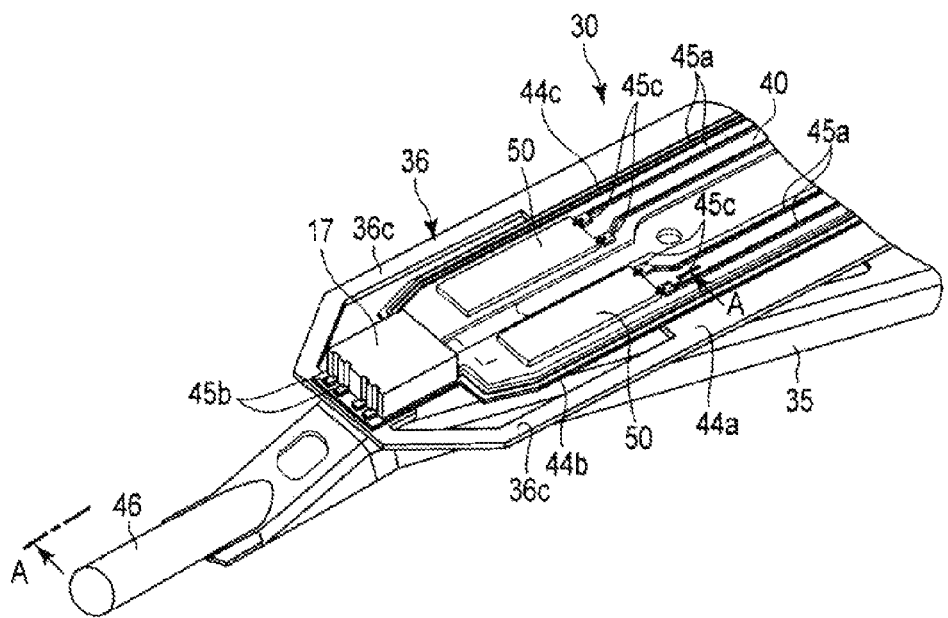
FIG. 3 is a perspective view showing a tip section and a gimbal section of the head gimbal assembly.
Figure 4:
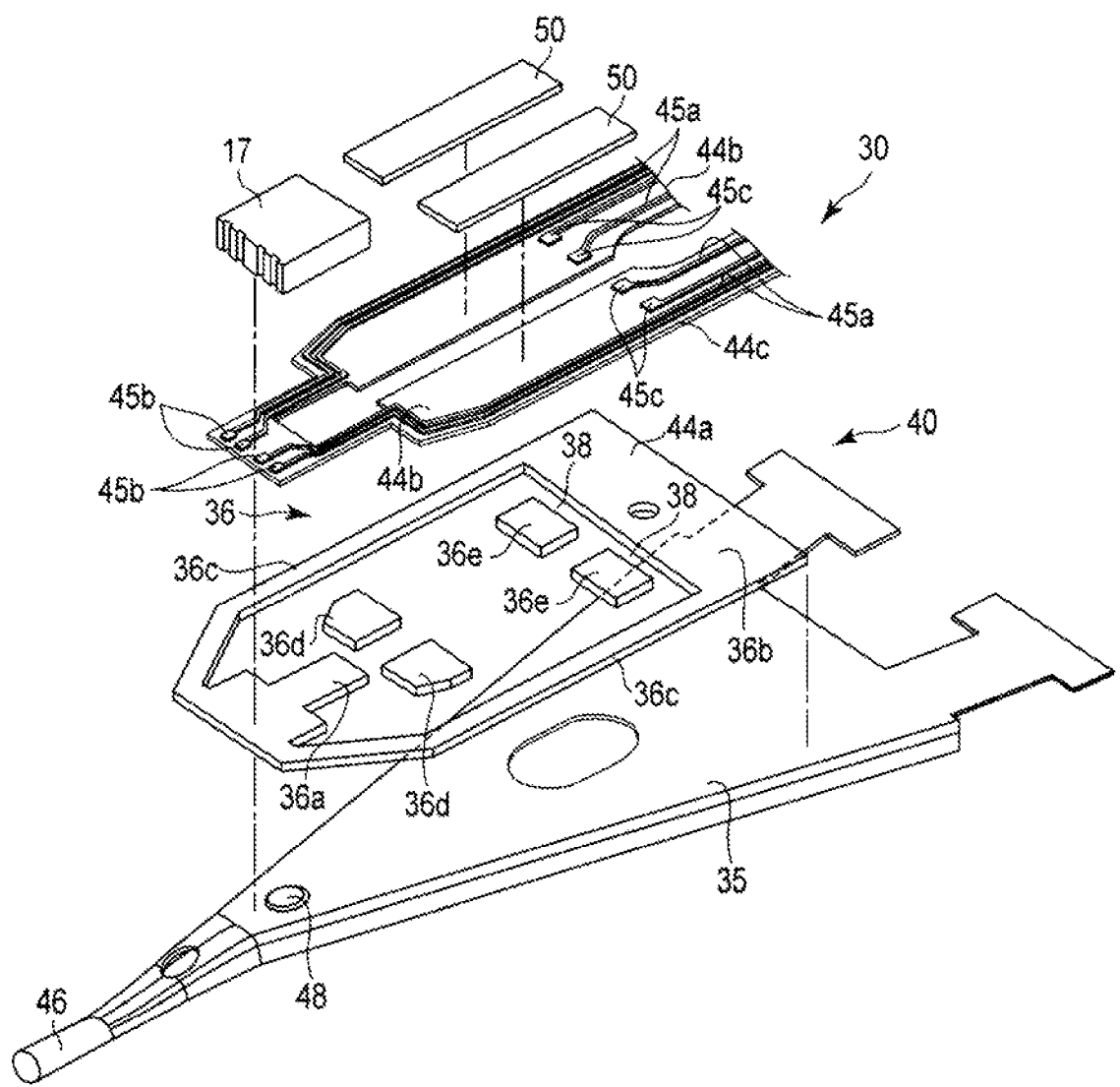
FIG. 4 is an exploded perspective view showing a magnetic head, piezoelectric elements, a flexure (a wiring member), and a load beam of the head gimbal assembly.
Figure 5:
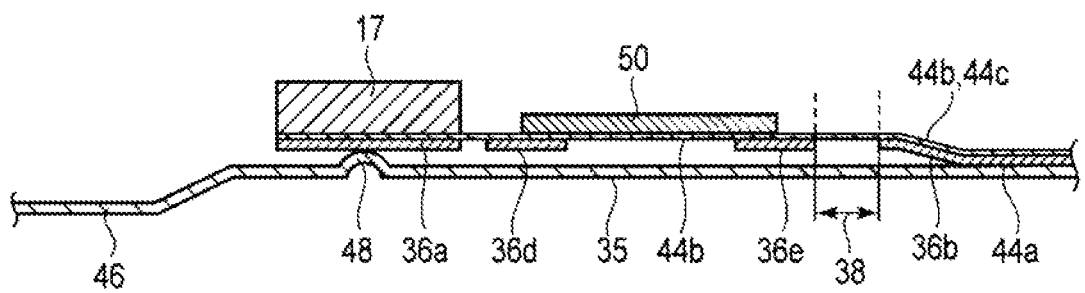
FIG. 5 is a sectional view of the tip section of the head gimbal assembly taken on the line A-A of FIG. 3.

FIG. 3 is a perspective view showing an enlarged magnetic head portion of the HGA 30, FIG. 4 is an exploded perspective view showing the magnetic head, the piezoelectric elements, the flexure, and the load beam of the HGA, and FIG. 5 is a sectional view of the HGA, showing a portion in which the piezoelectric element is mounted.

As shown in FIGS. 2 to 5, the flexure 40 includes a metal thin plate (a backing layer) 44a made of stainless steel or the like, the metal thin plate (the backing layer) 44a serving as a base, an insulating layer 44b formed on the metal thin plate, a conductive layer (a wiring pattern) 44c that is formed on the insulating layer 44b and forms a plurality of wiring 45a, and a protective insulating layer (not shown) covering the conductive layer 44c, and is formed as a long, strip-shaped laminated plate. The side of the tip-side portion 40a of the flexure 40 where the metal thin plate 44a is located is pasted or spot-welded to the surfaces of the load beam 35 and the base plate 42.

In the gimbal section 36 of the flexure 40, the metal thin plate 44a includes a rectangular tongue section 36a located on the tip side, a rectangular base end 36b located on the base end side with a spacing (distance) between the tongue section 36a and the base end 36b, and a pair of right and left link sections 36c extending from the tongue section 36a to the base end 36b. In the space between the tongue section 36a and the base end 36b, a pair of island-shaped first supporting sections (supporting pads) 36d and a pair of island-shaped second supporting sections (supporting pads) 36e are provided. These first and second supporting sections 36d and 36e are formed of a metal thin plate.

The pair of first supporting sections 36d is located near the tongue section 36a and is disposed side by side in the width direction of the gimbal section 36. Moreover, the pair of second supporting sections 36e is located near the base end 36b and is disposed side by side in the width direction of the gimbal section 36. Between each second supporting section 36e and the base end 36b, a slit section or a notch section 38 is provided, and the second supporting sections 36e and the base end 36b are separated from each other. The first supporting sections 36d and the second supporting sections 36e are arranged in the longitudinal direction of the gimbal section 36 with a space section between the first supporting sections 36d and the second supporting sections 36e.

In the gimbal section 36, the insulating layer 44b and the conductive layer 44c extend to the tip side of the tongue section 36a passing over the base end 36b, passing through the slit section or the notch section 38, passing over the pair of second supporting sections 36e, passing through the space section, and passing over the pair of first supporting sections 36d.

The magnetic head 17 is fixed to the tongue section 36a with an adhesive and the insulating layer 44b is disposed between the magnetic head 17 and the tongue section 36a. The base end 36b of the metal thin plate 44a is fixed to the load beam 35 by welding or the like. A portion of the tongue section 36a which is substantially at the center thereof makes contact with a dimple (a support protrusion) 48 provided in the tip section of the load beam 35 in such a way as to protrude therefrom. The tongue section 36a and the magnetic head 17 may swing or roll about the dimple 48 by elastic deformation of the link sections 36c.

The piezoelectric elements 50 are formed to have a long, rectangular plate-like shape and expand and contract in the longitudinal direction thereof. The piezoelectric elements 50 are fixed to the insulating layer 44b of the gimbal section 36 with an adhesive or the like. The piezoelectric elements 50 are disposed in such a way that the longitudinal direction thereof is parallel to the longitudinal direction of the load beam 35 and the flexure 40. As a result, the two piezoelectric elements 50 are disposed in such a way that the piezoelectric elements 50 are arranged parallel to each other and a space is left therebetween in the width direction of the gimbal section 36.

As shown in FIG. 5, one end of each piezoelectric element 50 in the longitudinal direction thereof, that is, an end of the piezoelectric element 50 on the side where the magnetic head 17 is located is supported on the first supporting section 36d. The other end of each piezoelectric element 50 in the longitudinal direction thereof, that is, an end of the piezoelectric element 50 on the side where the base end 36b is located is supported on the second supporting section 36e.

As shown in FIGS. 3 to 5, some of the wiring 45a of the flexure 40 are wiring for transmitting a recording and reproduction signal to the magnetic head 17, and these wiring extend to the magnetic head 17 and include electrode pads 45b at the extension ends thereof. These electrode pads 45b and the recording and reproduction elements of the magnetic head 17 are electrically joined to each other with solder or an electrically-conducting adhesive such as a silver paste. Moreover, some of the wiring 45a of the flexure 40 transmit a drive signal to the piezoelectric elements 50, and these wiring extend to the vicinity of the piezoelectric elements 50 and include electrode pads 45c at the extension ends thereof. These electrode pads 45c and the piezoelectric elements 50 are electrically joined to each other with solder or an electrically-conducting adhesive such as a silver paste. Incidentally, these wiring 45a extend to the connection end side of the flexure along the flexure 40 and are connected to connection pads (not shown) provided at the connection end.

Figure 6:
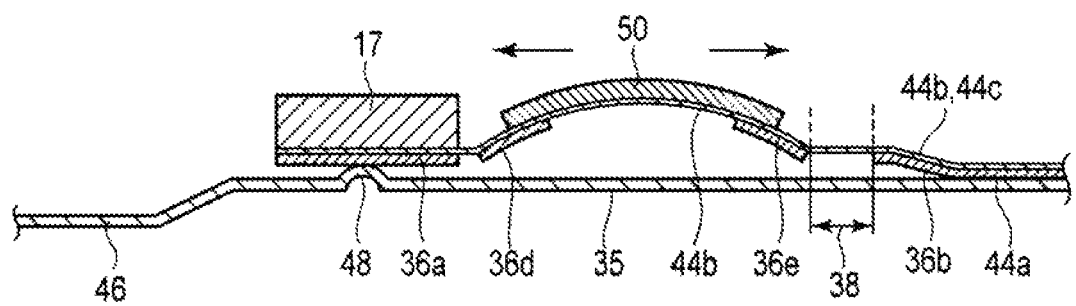
FIG. 6 is a sectional view of the head gimbal assembly corresponding to FIG. 5 in a state in which the piezoelectric element expands.
Figure 7:
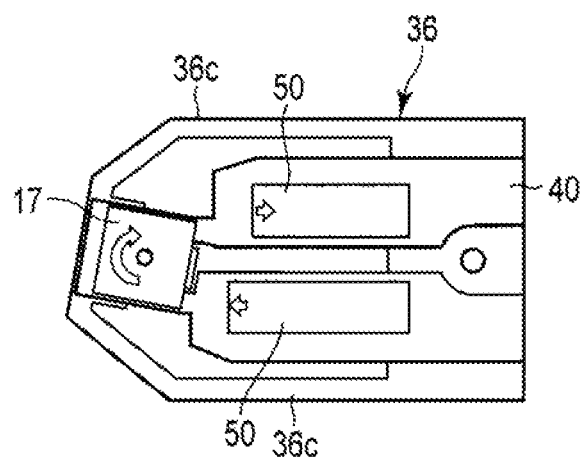
FIG. 7 is a plan view schematically showing a drive state of the magnetic head by the piezoelectric elements.

Each piezoelectric element 50 expands and contracts in the longitudinal direction of the flexure 40 by a voltage application as indicated with arrows in FIGS. 6 and 7. By driving these two piezoelectric elements 50 in such a way that the piezoelectric elements 50 expand and contact in opposite directions, the tongue section 36a of the gimbal section 36 may be swung via the flexure 40 and the magnetic head 17 may be displaced in a seek direction. In this embodiment, since the space between the first supporting section 36d and the second supporting section 36e that support the piezoelectric elements 50 and the base end 36b of the metal thin plate 44a is mainly maintained by the low rigidity of the insulating layer 44b, the out-of-plane vibration during driving of the piezoelectric elements is prevented from being transferred to the load beam 35 via the base end 36b of the metal thin plate 44a.

As shown in FIG. 1, the HSA 22 includes a supporting frame extending from the bearing unit 28 in a direction opposite to the arm 32, and a voice coil forming part of the VCM 24 is embedded in the supporting frame. When the HSA 22 configured as described above is mounted on the base 12, a lower end of the pivot of the bearing unit 28 is fixed to the base 12, and the bearing unit 28 is erected in such a way as to be substantially parallel to the spindle of the spindle motor 18. Each magnetic disk 16 is located between the two HGAs 30. During operation of the HDD, the magnetic heads 17 attached to the suspensions 34 face the top face and the lower face of each magnetic disk 16 and are located on the sides where the faces of the magnetic disk 16 are located. The voice coil fixed to the supporting frame is located between a pair of yokes 37 fixed on the base 12, and these yokes and a magnet (not shown) fixed to one yoke form the VCM 24.

As further shown in FIG. 1, the substrate unit 21 includes a main body 21a formed of a flexible printed circuit board, and the main body 21a is fixed to the bottom wall 12a of the base 12. On the main body 21a, a connector and an electronic component for connection with the printed circuit board (both not shown) are mounted.

The substrate unit 21 includes a main flexible printed circuit board (hereinafter referred to as a main FPC) 21b extending from the main body 21a. An extension end of the main FPC 21b forms a connection end and is fixed to the vicinity of the bearing unit 28 of the HSA 22. The flexure 40 of each HGA 30 is mechanically and electrically connected to the connection end of the main FPC 21b. As a result, the substrate unit 21 is electrically connected to the magnetic head 17 and the piezoelectric elements 50 via the main FPC 21b and the flexure 40.

As shown in FIG. 1, the ramp loading mechanism 25 includes a ramp 47 disposed outside the magnetic disks 16 on the bottom wall 12a of the base 12 and the tab 46 (see FIGS. 2 to 4) extending from the tip of each suspension 34. When the HSA 22 rotationally moves about the bearing unit 28 and the magnetic heads 17 move to the retraction position located outside the magnetic disks 16, each tab 46 engages a ramp surface formed in the ramp 47 and is then pulled up by the inclination of the ramp surface. As a result, the magnetic heads 17 are unloaded from the magnetic disks 16 and are held in the retraction position.

According to the HDD and the HGA 30 configured as described above, the piezoelectric elements 50 are attached to the gimbal section 36 of the flexure 40, and, by applying a voltage to the piezoelectric elements 50 via the flexure 40, the magnetic head 17 attached to the gimbal section may be displaced in a seek direction. As a result, by controlling the voltage applied to the piezoelectric elements 50, the position of the magnetic head 17 may be finely controlled and the positioning accuracy of the magnetic head may be improved.

Moreover, in the gimbal section 36 to which the piezoelectric elements 50 are attached, the first supporting sections 36d and the second supporting sections 36e of the metal thin plate 44a, the first supporting sections 36d and the second supporting sections 36e supporting both ends of the piezoelectric elements 50 in the longitudinal direction thereof, are separated from and independent of the base end 36b of the metal thin plate 44a. The first supporting sections 36d and the second supporting sections 36e and the base end 36b of the metal thin plate 44a are connected to one another mainly by the insulating layer 44b having low rigidity. Therefore, even when an out-of-plane vibration is generated in the piezoelectric elements 50 and the first and second supporting sections 36d and 36e during driving of the piezoelectric elements 50, the out-of-plane vibration are prevented from being transferred to the load beam 35 via the base end 36b of the metal thin plate 44a. As a result, a head gimbal assembly that suppresses unnecessary resonance excitation of the load beam 35 and improves the positioning accuracy of the magnetic head 17 may be obtained.

Next, HGAs according to other embodiments will be described. In the other embodiments described below, portions that are identical to those of the first embodiment described above are identified with the same reference characters, and the detailed descriptions thereof are omitted.

Second Embodiment

Figure 8:
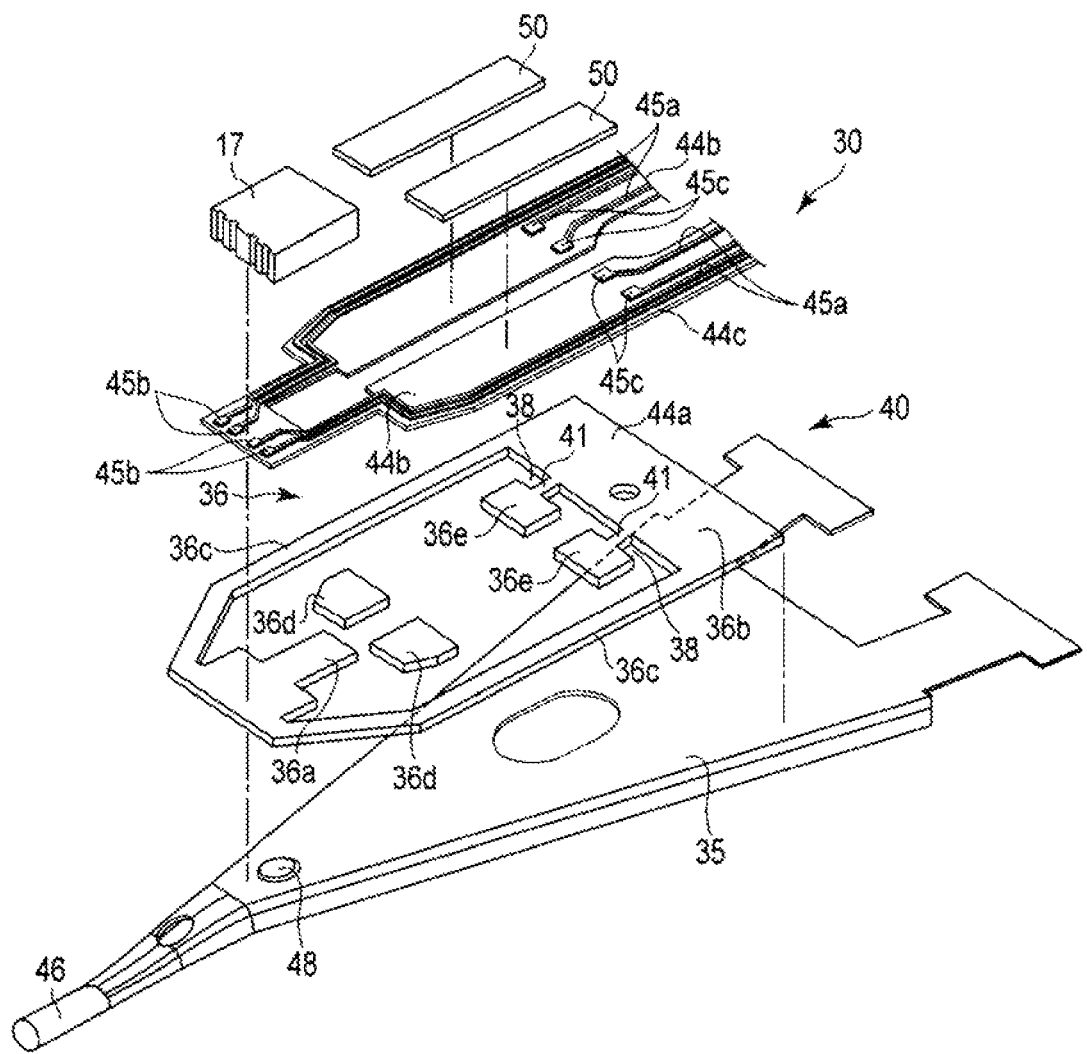
FIG. 8 is an exploded perspective view showing a magnetic head, piezoelectric elements, a flexure, and a load beam of a head gimbal assembly according to a second embodiment.

FIG. 8 is an exploded perspective view showing a magnetic head 17, piezoelectric elements 50, a flexure 40, and a load beam 35 of an HGA 30 according to a second embodiment. According to this embodiment, in a gimbal section 36, part of each of a pair of second supporting sections 36e of a backing metal thin plate 44a is connected to the base end 36b by a long bridge section 41. The width of the bridge section 41 is formed to be sufficiently smaller than the width of the second supporting section 36e. Except for the bridge section 41, each second supporting section 36e is separated from the base end 36b by the notch section 38.

In the second embodiment, the other structures of the HGA 30 and the HDD are the same as the structures of the HGA 30 and the HDD of the first embodiment described previously.

Also in the second embodiment structured as described above, an out-of-plane vibration that is transferred from the second supporting section 36e to the base end 36b of the metal thin plate 44a may be reduced and unnecessary resonance excitation of the load beam may be suppressed. Moreover, since the bridge section 41 is provided, the supporting stability of the piezoelectric elements 50 is improved. As a result, a head gimbal assembly that improves the positioning accuracy of the magnetic head 17 may be obtained.

Third Embodiment

Figure 9:
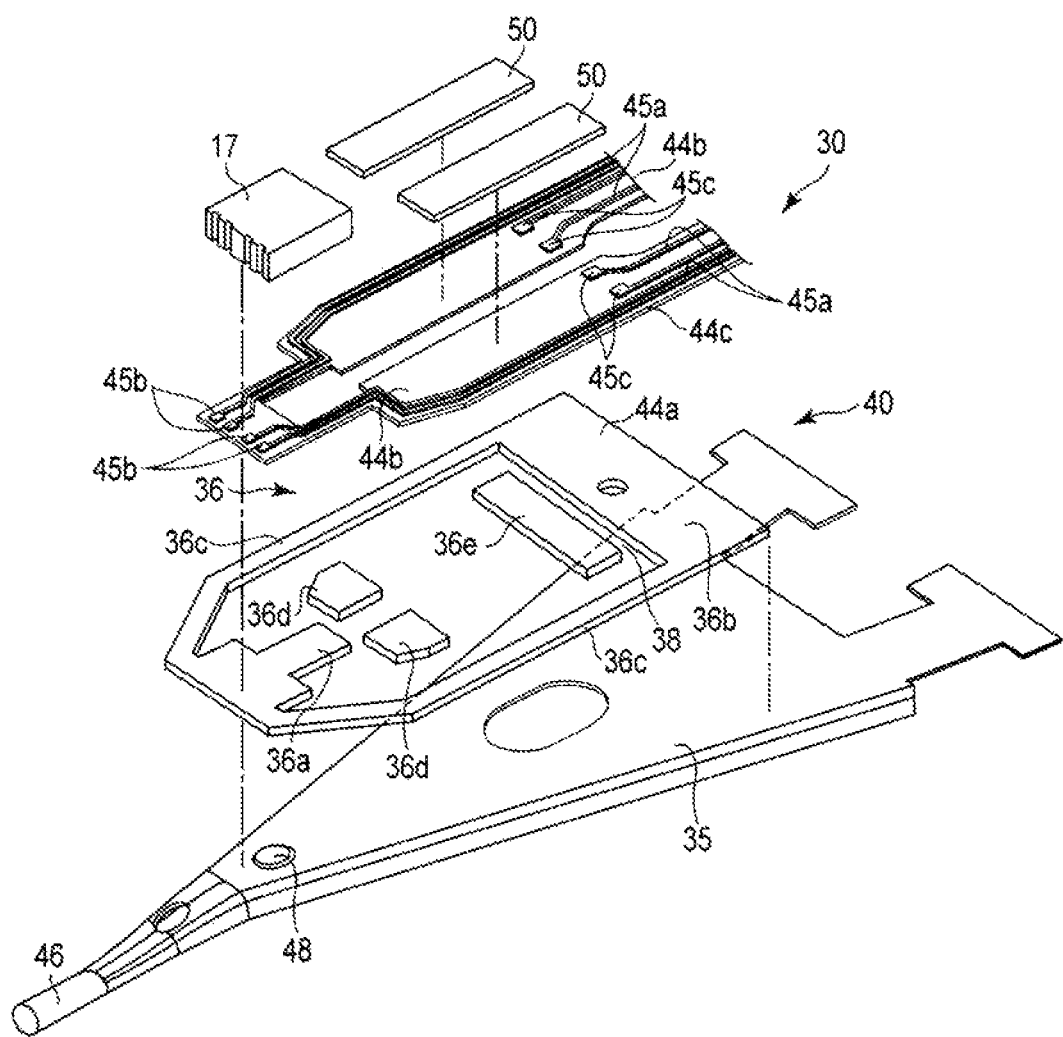
FIG. 9 is an exploded perspective view showing a magnetic head, piezoelectric elements, a flexure, and a load beam of a head gimbal assembly according to a third embodiment.

FIG. 9 is an exploded perspective view showing a magnetic head 17, piezoelectric elements 50, a flexure 40, and a load beam 35 of an HGA 30 according to a third embodiment. According to this embodiment, in a gimbal section 36, the second supporting section 36e of a backing metal thin plate 44a is formed as one common second supporting section. The second supporting section 36e is formed to have a rectangular shape and extends in the width direction of the gimbal section 36. Moreover, the second supporting section 36e is separated from a base end 36b by the slit section or the notch section 38. The single second supporting section 36e supports one end of each of the two piezoelectric elements 50.

In the third embodiment, the other structures of the HGA 30 and the HDD are the same as the structures of the HGA 30 and the HDD of the first embodiment described previously.

Also in the third embodiment structured as described above, an out-of-plane vibration that is transferred from the second supporting section 36e to the base end 36b of the metal thin plate 44a may be reduced and unnecessary resonance excitation of the load beam may be suppressed. As a result, a head gimbal assembly and the HDD that improves the positioning accuracy of the magnetic head 17 may be obtained. In a modification of the third embodiment, the second supporting section 36e may be connected to the base end 36b by one or a plurality of bridge sections.

Figure 10:
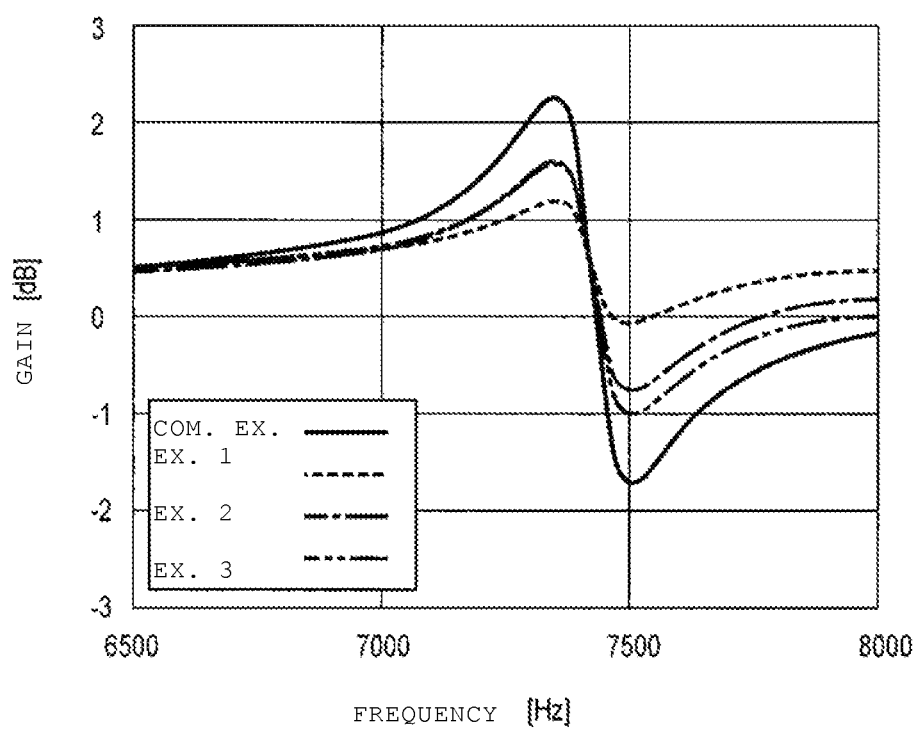
FIG. 10 is a diagram showing a comparison among the vibrations generated in the cross-track direction in a light gap position of the magnetic head in the head gimbal assemblies according to the first to third embodiments and a head gimbal assembly according to a comparative example.

FIG. 10 shows the results of a simulation of frequency transmission characteristics of cross-track direction displacement at a write gap position (or read-write element position) of a magnetic head for a drive voltage of the piezoelectric elements 50. The simulation is performed using a finite-element analysis on the HGAs according to the first to third embodiments described above and a comparative example. Moreover, in FIG. 10, the frequency transmission characteristics in the 7 kHz band which is a primary torsional resonance frequency of the load beam are shown. In an HGA according to the comparative example, a second supporting section is integrally formed in a base end of a metal thin plate.

The load beam 35 used in the simulation is a stainless plate which is 30 μm in thickness. In the flexure 40, the backing metal thin plate is a stainless plate which is 18 μm in thickness, the insulating layer 44b is 8 μm in thickness, and the conductive layer 44c is 12 μm in thickness. The thickness of each piezoelectric element 50 is 10 μm. Moreover, the conditions of a voltage application to the piezoelectric elements 50 are the same.

It is found from FIG. 10 that, under the same condition of a voltage application, the primary torsional resonance gains of the load beams in the first to third embodiments are smaller than the primary torsional resonance gain of the load beam in the comparative example. Therefore, in simulations, the first to third embodiments described above are shown to prevent the out-of-plane vibration of the piezoelectric elements 50 that is generated during driving when the torsional resonance of the load beam is unnecessarily excited and thereby enhance the positioning performance of the suspension and the magnetic head.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the embodiments described above, as the arms of the HSA, plate-like arms which are independent of one another are used, but the arms are not limited to such arms; a structural member into which a plurality of so-called E-block-shaped arms and a bearing sleeve are integrated together may be applied. The magnetic disk is not limited to a 2.5-inch magnetic disk, and a magnetic disk of other size may be used. The number of magnetic disks is not limited to two, and one or three or more magnetic disks may be used. The number of HGAs may also be increased or reduced in accordance with the number of placed magnetic disks.

What is claimed is:

1. A head gimbal assembly comprising:
a load beam;
a wiring member including a metal plate disposed on the load beam, an insulating layer disposed on the metal plate and the load beam, and a conductive layer formed on the insulating layer, the conductive layer forming first and second wirings;
a magnetic head electrically connected to the first wiring of the wiring member and attached to a tip section of the wiring member; and
a piezoelectric element that is fixed to and supported by supporting pads and configured to deform in response to a voltage applied thereto through the second wiring, wherein
the metal plate includes a tip section to which the magnetic head is fixed, and a base section that is spaced apart from the tip section of the metal plate and is fixed to the load beam, and the supporting pads include first and second supporting pads proximate to the tip section of the metal plate and distal from the base section and a third supporting pad proximate to the base section and distal to the tip section of the metal plate, each of the supporting pads structurally separated from and independent of both the tip section of the metal plate and the base section.

2. The head gimbal assembly according to claim 1, wherein the supporting pads include a fourth supporting pad proximate to the base section and distal to the tip section of the metal plate.

3. The head gimbal assembly according to claim 2, wherein the piezoelectric element includes a first piezoelectric strip fixed to and supported by the first and third supporting pads and a second piezoelectric strip fixed to and supported by the second and fourth supporting pads.

4. The head gimbal assembly according to claim 3, wherein the third and fourth supporting pads are structurally separate from the base section.

5. The head gimbal assembly according to claim 1, wherein the piezoelectric element includes first and second piezoelectric strips each having a longitudinal axis aligned parallel to and on either side of a longitudinal axis of the metal plate.

6. The head gimbal assembly according to claim 5, wherein the piezoelectric strips deform in response to the voltage applied thereto to rotate the magnetic head about an axis that is perpendicular to a plane of the metal plate.

7. The head gimbal assembly according to claim 1, wherein the piezoelectric element is fixed to and supported by the supporting pads through the insulating layer of the wiring member.

8. A head gimbal assembly comprising:
a load beam;
a wiring member including a metal plate and an insulating layer disposed on the metal plate and the load beam, the metal plate including a tip section that is movable away from the load beam, and a base section that is fixed to the load beam;
a magnetic head electrically connected to a wiring of the wiring member and attached to a tip section of the wiring member; and
a piezoelectric element that is fixed to and supported by supporting pads through the insulating layer and configured to deform in response to a voltage applied thereto through the wiring of the wiring member, the supporting pads including first and second supporting pads proximate to the tip section of the metal plate and distal from the base section and a third supporting pad proximate to the base section and distal to the tip section of the metal plate, each of the supporting pads structurally separated from and independent of both the tip section of the metal plate and the base section.

9. The head gimbal assembly according to claim 8, wherein the supporting pads include a fourth supporting pad proximate to the base section and distal to the tip section of the metal plate.

10. The head gimbal assembly according to claim 9, wherein the piezoelectric element includes a first piezoelectric strip fixed to and supported by the first and third supporting pads and a second piezoelectric strip fixed to and supported by the second and fourth supporting pads.

11. The head gimbal assembly according to claim 10, wherein the third and fourth supporting pads are structurally separate from the base section.

12. A storage device comprising:
a disk-shaped recording medium;
a driving motor that supports and rotates the recording medium; and
a head gimbal assembly including
a load beam;
a wiring member including a metal plate disposed on the load beam, an insulating layer disposed on the metal plate and the load beam, and a conductive layer formed on the insulating layer, the conductive layer forming first and second wirings;
a magnetic head electrically connected to the first wiring of the wiring member and attached to a tip section of the wiring member; and
a piezoelectric element that is fixed to and supported by supporting pads and configured to deform in response to a voltage applied thereto through the second wiring, wherein
the metal plate includes a tip section to which the magnetic head is fixed, and a base section that is spaced apart from the tip section of the metal plate and is fixed to the load beam, and
the supporting pads include first and second supporting pads proximate to the tip section of the metal plate and distal from the base section and a third supporting pad proximate to the base section and distal to the tip section of the metal plate, each of the supporting pads structurally separated from and independent of both the tip section of the metal plate and the base section.

13. The device according to claim 12, wherein the piezoelectric element includes first and second piezoelectric strips each having a longitudinal axis aligned parallel to and on either side of a longitudinal axis of the metal plate.

14. The device according to claim 13, wherein the piezoelectric strips deform in response to the voltage applied thereto to rotate the magnetic head about an axis that is perpendicular to a plane of the metal plate.

15. The device according to claim 12, wherein the piezoelectric element is fixed to and supported by the supporting pads through the insulating layer of the wiring member.

* * * * *